Nov. 19, 1929.   B. A. PROCTOR   1,736,750
PHOTOGRAPHIC APPARATUS
Original Filed Sept. 8, 1925    3 Sheets-Sheet 1

INVENTOR.
BARTON ALLEN PROCTOR
BY Waldo G. Morse
ATTORNEYS.

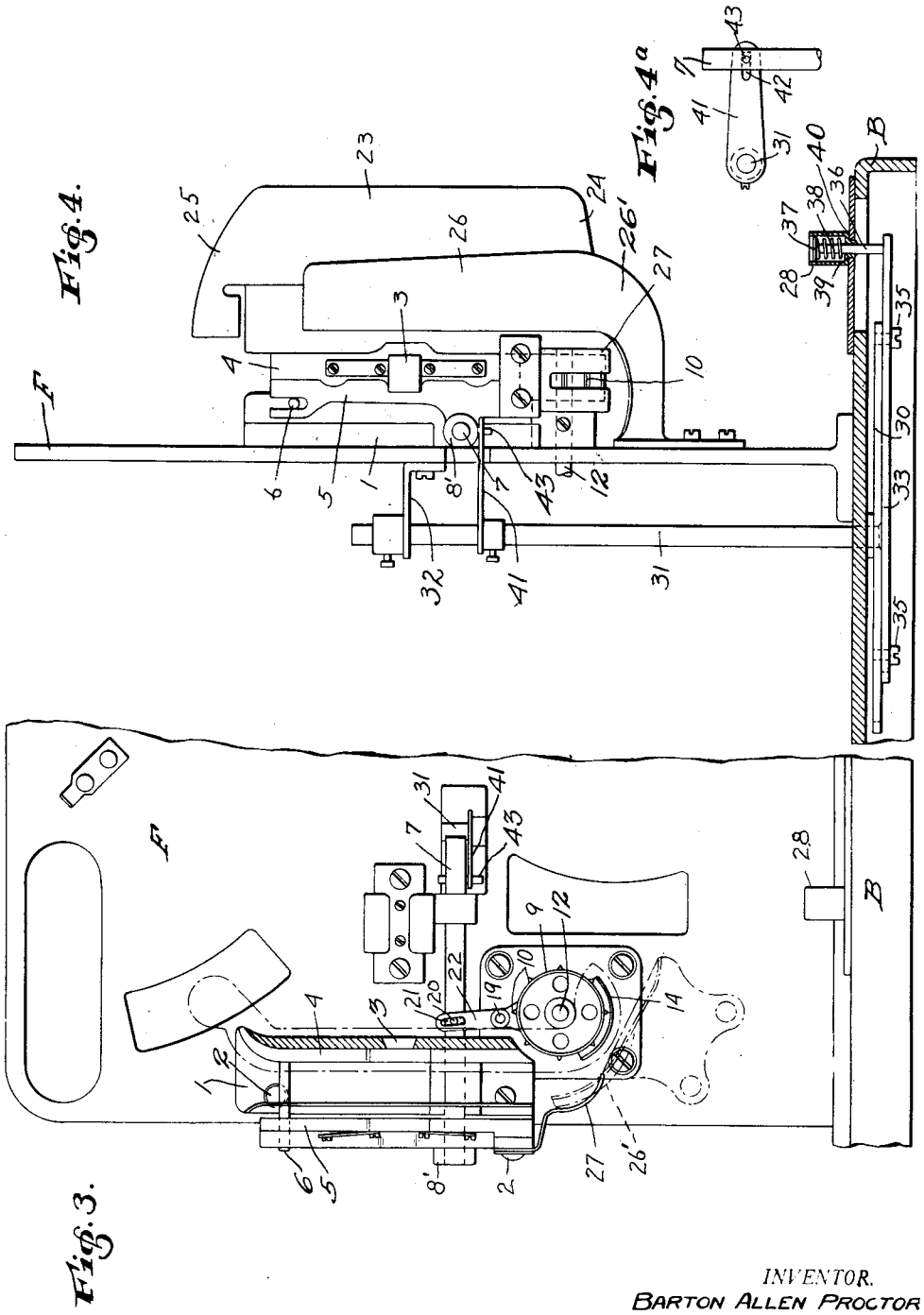

Nov. 19, 1929.   B. A. PROCTOR   1,736,750
PHOTOGRAPHIC APPARATUS
Original Filed Sept. 8, 1925   3 Sheets-Sheet 3
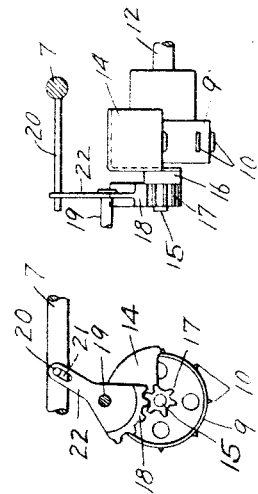
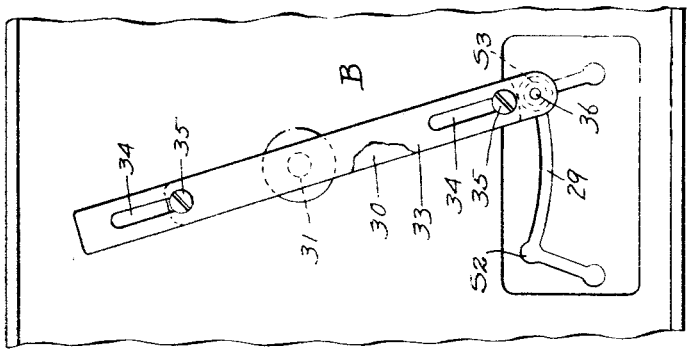
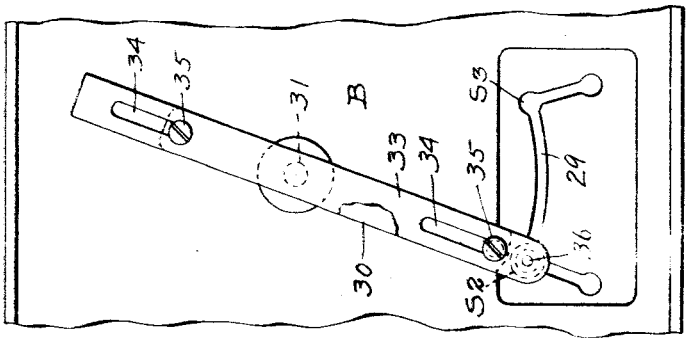
INVENTOR.
BARTON ALLEN PROCTOR
BY Waldo G. Morse
ATTORNEYS.

Patented Nov. 19, 1929

1,736,750

UNITED STATES PATENT OFFICE

BARTON ALLEN PROCTOR, OF PELHAM MANOR, NEW YORK, ASSIGNOR TO WALDO G. MORSE, TRUSTEE, OF NEW YORK, N. Y.

PHOTOGRAPHIC APPARATUS

Original application filed September 8, 1925, Serial No. 54,910. Divided and this application filed February 28, 1929. Serial No. 343,301.

The present invention relates broadly to the art of photography, and more particularly to improvements in apparatus adapted for the taking and projection of pictures either as so called still or motion pictures.

Heretofore in the art to which the invention relates it has been customary to thread films into position by hand, this operation being extremely difficult not only by reason of the sensitiveness of the films being handled and the different parts through or around which they have had to be threaded, but also because of the operating conditions usually obtaining where such apparatus is used. The present invention has for one of its objects the provision of an improved apparatus by means of which the threading operation is greatly expedited, and if desired, performed entirely without the necessity of the operator actually touching the film.

The present application is a division of my co-pending application, Serial No. 54,910, filed September 8, 1925.

An object of the present invention is to provide an improved form of openable gate, means adapted bodily to remove the film from the feeding member cooperating with such gate, and to shield it from such member, and a simple and effective control mechanism for such gate and means, such control preferably embodying a single operating button or knob. Another object is to provide means adapted bodily to position the film in operative relation to the feeding member, and control mechanism for such film positioning means, film removing and shielding means, and gate, whereby such cooperation between each of the same as is necessary or desirable is secured. A further object is to provide guiding means which effectively cooperate with the various elements associated with the gate, preferably so as to facilitate the positioning of a film in relation to such elements by a single bodily manual movement thereof lateral to its path of travel through the gate and its removal from such relation by a corresponding manual movement.

Another object of the present invention is to provide an apparatus of the general character hereinbefore referred to which is adapted for use either with films in which both ends are permanently secured to different carriers, or in which only one end is secured to a carrier, or of the character in which the film is loosely wound around carriers.

Other and further advantages both of construction and operation will be apparent from the following specification and drawings constituting a part thereof. In these drawings there are shown for purposes of illustration only certain preferred embodiments of the present invention, it being understood that the drawings do not define the limits of my invention as changes in the construction and operation disclosed therein may be made without departing either from the spirit of the invention or the scope of the broader claims.

In the drawings:

Figure 3 is a partial right side elevation broken away to show actuating parts in film threading position;

Figure 4 is a view taken on the line 4—4 of Figure 1;

Figure 2:
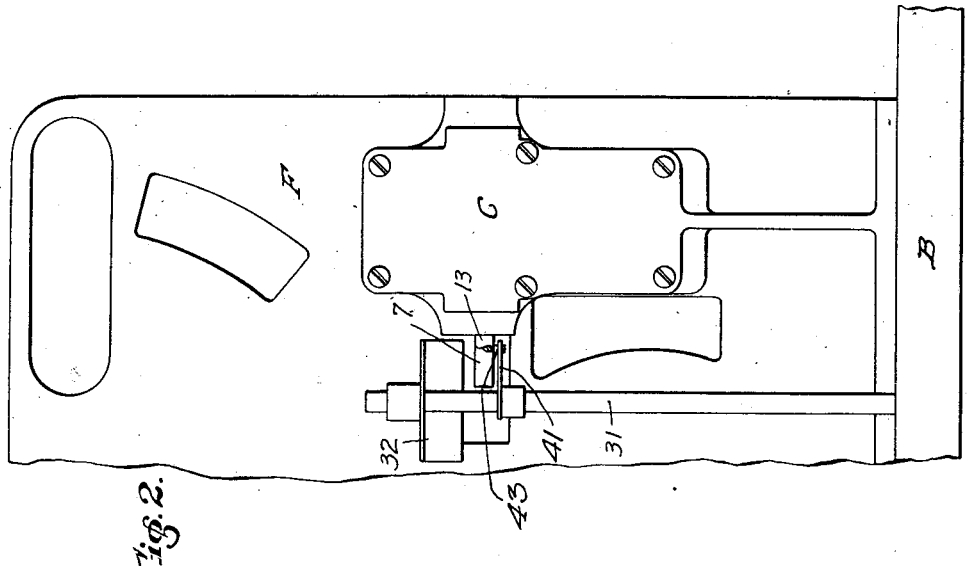
Figure 2 is a left side elevation showing actuating parts in film threading position.

Figure 4$^a$ is a detail view of the gate rod crank lever and associated parts;

Figure 5 is a partial bottom plan view showing actuating levers in a "film feeding" position;

Figure 6 is a partial bottom plan view showing actuating levers in "film threading or changing" position;

Figure 7 is a detail view showing segment and pinion for actuating film-stripping shield;

Figure 8 is a front view of the same.

Preferably mounted on the front side of the frame F is a gate section 1 secured in any desired manner as by screws 2 against movement relatively to the frame. This section is preferably formed with an aperture 3 through which light may be projected as well understod in the art, and with a film guiding depression 4 extending lengthwise of the section, and intersecting the opening 3, for the travel of the film. Cooperating with the section 1 is a relatively movable section 5 preferably guided by a pin 6 projecting outwardly from the section 1, and secured to one end of a gate opening rod 7 slidable through a suitable opening in the gate section 1 and a suitable bearing 8 on the frame F, such connection between the gate opening rod and the movable section of the gate including the boss 8'. By reason of this construction, it will be apparent that when the rod 7 is moved to the left as viewed in Figure 1, it will be effective for moving the section 5 away from the section 1 to permit the removal of a film and the insertion of a new film, while movement in the opposite direction will bring the sections into cooperative relationship.

For effecting the desired intermittent feeding motion of a film in position in the gate, there may be provided a feeding sprocket 9 having film engaging teeth 10 adapted to engage apertures or perforations substantially centrally positioned in the film. This sprocket is mounted on a shaft 12 extending transversely through the frame F and driven in any suitable manner by power applied as through the shaft 13. Any preferred intermittent moving mechanism may be mounted in the casing C.

The film may be positioned as within a double or single container or wound loosely upon a reel, and such container or reel may be supported in any desired manner, as upon spindles, not shown, such supporting means being appropriately positioned in regard to the gate and its associated parts. Between such supporting means and the gate, tension control mechanism or feeding sprockets and their associated loops of slack film may be provided, if desired.

Figure 1:
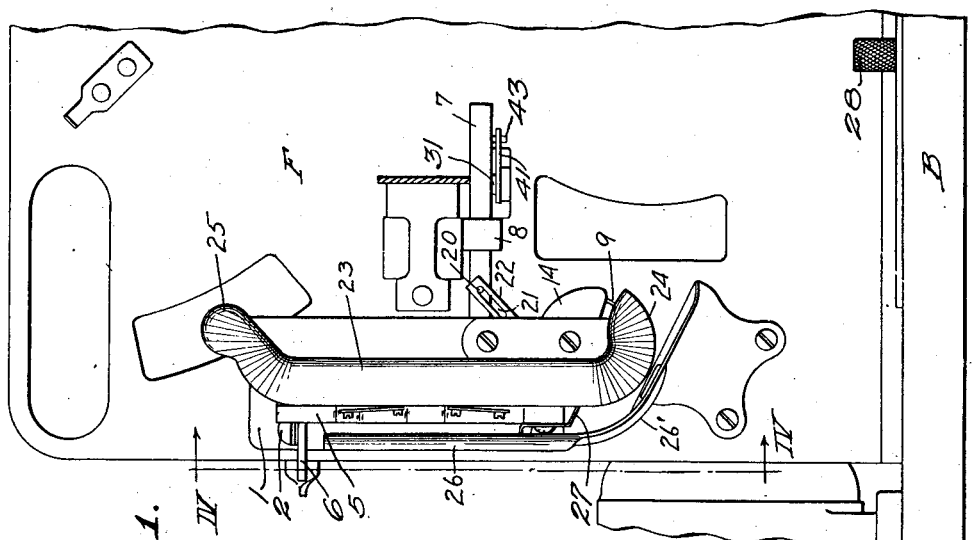
Figure 1 is a right side elevation of the gate and associated parts in film feeding position.

Cooperating with the sprocket 9 and normally occupying the position illustated in Figures 1, 7 and 8 in the drawings, is a stripping shield 14 carried by the inner end of a shaft 15 supported in a suitable manner by a bearing 16 constituting part of the fixed gate section 1. Also secured to the shaft 15 is a pinion 17 with which meshes an arcuate rack 18 having a pivotal mounting 19 and operated simultaneously with the operation of the gate rod 7 by means of a pin 20 projecting outwardly from the gate opening rod and engaging a slot 21 in the extension 22 of the arcuate rack. With the construction just described, movement of the gate opening rod to the left as viewed in Figure 1 for the purpose of opening the relatively separable gate sections, will effect rotation of the rack in a counter-clockwise direction as viewed in this figure, thereby rotating the shield in a clockwise direction. This rotational movement of the shield will be effective for engaging the film and stripping the same from the sprocket preparatory to the removal of the film from the apparatus. It will remain in this position covering certain of the teeth of the sprocket during the application of a new film, whereby the threading operation of the film is greatly expedited.

For further assisting the threading movement, the relatively fixed gate section 1 is provided with a projecting guide 23 having a generally curved contour for gradually guiding the film over the fixed gate section, the guide having a downwardly curved and inclined lower end 24 for insuring passage of the film over the sprocket and an upwardly inclined and curved upper end 25. The frame F also has secured thereto a secondary guide member 26 positioned in spaced relation to the guiding member 23 and adapted to extend substantially in alignment with the inner face of the movable gate section when it has been moved to open position, whereby the film is effectively guided into position between these gate sections. The member 26 has a curved lower end 26' having a function corresponding to that of the curved end 24 of the guide member 23. Projecting downwardly from the lower end of the movable gate section is a pair of spaced guide fingers 27 constituting a shoe curved to generally conform to the curvature of the sprocket 9, the space between these fingers being sufficient to accommodate the teeth 10 of the sprocket. These guides cooperate in a manner, as will be readily apparent from the drawings, to permit a film to be positioned between the gate members by merely moving the same laterally relative to its normal direction of travel through the gate. This greatly lessens its time required for threading new film into position, and enables the operation to be performed satisfactorily by an unskilled operator.

In view of the fact that the present apparatus, while not necessarily limited to any particular field of use, is primarily intended for use by persons unskilled in the art, it is desirable to simplify the control to as great an extent as possible not only for the purpose of rendering the operation easier, but for the purpose of making such operation foolproof. For this purpose there is preferably provided a single control member in the form of a knob or button 28 projecting upwardly through a substantially U-shaped slot 29 in the supporting base B. This slot is so shaped as to provide a plurality of operating stations, those designated as $S^2$ and $S^3$ controlling the operation of the gate, stripping shield, and shoe. The button 28 is adapted to be moved at will so as to occupy either one of these stations. With the control button at station $S^2$, the gate is closed, the stripping shield withdrawn from its protective relation to the sprocket, and the shoe in cooperative relation with the sprocket. With the button in position at station $S^3$, the respective parts of the apparatus are in such position as to permit the positioning of a film therein or the removal of a film which has just been fed therethrough. It will be understood that the movement of the button from station S² to station S³ automatically produces the required change in the operating position of the parts.

The control mechanism actuated by the control knob is to a large extent illustrated in Figures 5 and 6, which illustrate in succession the change in the position of the parts of the control mechanism by movement of the control button. This mechanism may comprise a lever 30 keyed or otherwise secured to the lower end of a gate actuating shaft 31 having its lower end journaled in any desired manner in the base B and its upper end journaled in a bearing bracket 32. Being secured to the gate actuating shaft 31 which is capable only of a turning movement about its longitudinal axis, the lever 30 is restricted in its movements to rotation only. Carried by the rotating lever 30 is combined sliding and rotating lever 33 having adjacent each end a slot 34 through each of which projects a headed pin 35 by means of which the combined sliding and rotating lever is effectively mounted on the rotating lever for rotational movement simultaneously therewith and sliding movement independently thereof. At its front end the lever 33 carries an upstanding pin 36 having a head 37 against the under side of which bears one end of a compression spring 38. The opposite end of this spring bears against a flange 39 extending inwardly from the control button 28. By reason of this construction it will be apparent that the button may be moved vertically on the pin 36 but that the spring 38 will normally be effective for urging the button downwardly. At its lower end the button has a collar 40, of a diameter to substantially conform to the contour of the slot 29 at the respective operating stations, whereby with the button in its lower position accidental movement from one of these stations is prevented.

It may be assumed that it is desired to change a film or to move the parts of the apparatus into such position that a film may be threaded into position therein. Under such circumstances the control button will be moved from station S² to station S³. This movement will be effective for rotating the gate actuating shaft 31 in a counter clockwise direction as viewed in Figures 5 and 6. Such rotation of the gate actuating shaft is effective for opening the gate sections of the gate, for so actuating the stripper shield 14 as to effect the desired stripping movement of a film from the sprocket 9 and the shielding of the sprocket to permit the threading of a new film into position, and the movement of the shoe 27 away from the sprocket 9. These operations are obtained by securing to the gate actuating shaft a crank lever 41. As is clearly shown in Figure 4ª, this crank lever has a slot 42 in its free end into which projects a downwardly extending pin 43 carried by the gate control rod 7. By reference to the drawings, it will be evident that the previously mentioned rotation of the actuating shaft 31 will move the lever 41, as viewed in Figure 2, and the gate control rod 7, as viewed in Figure 1 or 3, to the left thus separating the gate sections, moving the shield 14 into stripping and shielding position, and moving the shoe 27 away from the sprocket 9, such parts thereupon occupying the positions shown in Figure 3.

With the contrary movement of the control button from station S³ to station S², the actuating shaft 31 will be rotated in a contrary direction the control rod 7 moved to the right as viewed in Figures 1 or 3, the shield 14 will be drawn from protective position, the shoe 27 moved into cooperative relation to the sprocket, and the gate closed.

Thus the movement of the control button from one station to another is effective to open the gate, remove the film from the teeth of the feeding member, and place the parts in such relation that the previously displayed film may be readily removed therefrom by a lateral movement and another film easily and quickly moved between the gate sections and in cooperative position relative to the shoe, the film being protected from the teeth of the sprocket. The movement of the control button from such second mentioned station to such first mentioned station will be effective to withdraw the shield from protective relation to the sprocket, position the film upon the sprocket, and close the gate.

The construction and location of the gate and sprocket enable these parts to be easily removed and other parts substituted for the accommodation of films of different widths. This affords increased flexibility in the use of the apparatus whereby it is not limited to films of any one width.

Throughout the foregoing description reference has been made generally to projecting apparatus. The apparatus without change, however, is capable of use for regular photographic purposes in the taking of pictures.

Certain advantages of the present invention arise from the provision of an apparatus of the general nature herein contemplated having a simplified control, preferably in the form of a single operating member.

Further advantages of the invention arise from the provision of a construction of such nature that a film may be easily and quickly threaded into operating position without the necessity of bringing the hands of the operator into contact with the film, or in which a film may be readily removed from the apparatus.

Still further advantages arise from the provision of an openable gate adapted to permit the ready insertion or removal of the film and having cooperating therewith guiding means of such nature as to insure the travel of the film in the desired direction merely upon a bodily lateral movement thereof relative to the normal direction of travel of the film through the gate.

Additional advantages arise from the provision of film stripping and sprocket shielding means.

I claim:

1. Film handling apparatus, comprising a toothed feeding member and a shielding member movable to a position embracing a portion of the area of operation of said feeding member, this last mentioned member being effective both to remove the film bodily from said feeding member and to protect it therefrom.

2. Film handling apparatus including an openable gate and mechanism effective to open said gate, said mechanism comprising a first member mounting for said member which prevents the axial movement thereof while permitting the rotation thereof, a second member which is longitudinally movable, means connecting said first and second members, and means to rotate said first member, whereby the rotation of said first member causes the longitudinal movement of the second member.

3. Film handling apparatus comprising means to feed a film, means bodily to remove a film from said feeding means, and control mechanism for said film removing means, said control mechanism comprising a first member mounting for said member which prevents the axial movement thereof while permitting the rotation thereof, a second member which is longitudinally movable, connecting means between said first and second members, and means to rotate said first member, whereby the rotation of said first member causes the longitudinal movement of said second member.

4. In a film handling apparatus, a gate including a fixed section and a section movable relatively thereto, means for feeding a film between said sections, a movable member for bodily removing the film from said feeding means, and means effective in timed relation for moving said movable section relatively to said fixed section and said member relatively to both of said sections whereby said gate is opened and the film removed from said feeding means.

5. In a film handling apparatus, a gate comprising a fixed section and a section movable relatively thereto, means to feed a film between said sections, movable means for bodily removing the film from said feeding means, and a common actuating mechanism effective for moving said movable section relative to said fixed section and said bodily removing means relative to said movable section.

6. In a film handling apparatus, an openable gate, toothed means for feeding a film therethrough, a member for bodily removing the film from the teeth of said feeding means, said member being adapted to occupy a plurality of positions in one of which it is relatively distant from the area of operation of said feeding means whereby engagement between the teeth thereof and the film is permitted and in another of which it embraces such area of operation whereby the film is protected from the teeth of said feeding means, and control means effective for opening said gate and moving said member to such protective position.

7. In a film handling apparatus, film carrying means, film feeding means including a sprocket, movable means embracing a substantial portion of said sprocket and effective for bodily removing the film therefrom, an openable gate through which the film travels, and control means effective for opening said gate and actuating said means for removing the film.

8. In a film handling apparatus, a toothed member for positively feeding a perforated film to project or expose the same, means for moving the film into operative contact with the teeth of said member, means movable through that portion of the path of the film which lies between said last mentioned means and the area of operation of the teeth of said member and effective for bodily removing the film from the teeth of said member, and a common actuating mechanism for both of said means.

9. In a film handling apparatus, a feeding sprocket and a member movable relatively thereto for bodily removing a film therefrom, said member embracing a substantial portion of said sprocket.

10. In a film handling apparatus, a toothed feeding sprocket, a movable member embracing a portion thereof, and means to move said member relatively to said sprocket whereby said member removes a film from the teeth of said sprocket and protects it therefrom when in such removed position.

11. In a film handling apparatus, a feeding sprocket and a member for bodily removing a film therefrom, said member embracing a substantial portion of said sprocket and being movable co-axially therewith.

12. In a film handling apparatus, a feeding sprocket and a member for bodily removing a film therefrom, said member embracing a substantial portion of said sprocket and being movable through an arc which intersects the path through which the film is fed by said sprocket.

13. In a film handling apparatus, feeding means and a member for bodily removing a film therefrom, said member being movable through an arc which intersects the path through which the film is fed by said means.

14. In a film handling apparatus, toothed feeding means and a member for bodily removing a film therefrom, said member being movable through the path through which the film is fed by said means and positioned after such movement between the film and the entire area of operation of said means.

15. A film handling apparatus comprising a feeding sprocket and a movable film engaging member cooperating therewith, said member being adapted both to remove the film bodily from said sprocket and to be positioned between the film and the normal area of operation of said sprocket when the film is in such removed position.

16. A film handling apparatus comprising a feeding member and a movable film engaging member cooperating therewith, said member being adapted both to remove the film bodily from said feeding member and to be positioned between the film and the normal area of operation of said feeding member when the film is in such removed position.

17. In a film handling apparatus, a toothed feeding sprocket and a member for protecting a film from the teeth of said sprocket, said member embracing a substantial portion of said sprocket and being movable coaxially therewith.

18. In a film handling apparatus, toothed feeding means and a member for protecting a film therefrom, said member being movable through an arc which intersects the path through which the film is fed by said means.

19. In a film handling apparatus, toothed means for feeding a film, a member for protecting the film from the teeth of said feeding means, said member being adapted to occupy a plurality of positions in one of which it is relatively distant from the area of operation of said feeding means whereby engagement between the teeth thereof and the film is permitted and in another of which it embraces such area of operation whereby the film is protected from the teeth of said feeding means, and control means effective for moving said member from one of said position to the other.

20. In a film handling apparatus, toothed means for feeding a film, a member for bodily removing the film from the teeth of said feeding means, said member being adapted to occupy a plurality of positions in one of which it is relatively distant from the area of operation of said feeding means whereby engagement between the teeth thereof and the film is permitted and in another of which it embraces such area of operation whereby the film is protected from the teeth of said feeding means, and control means effective for moving said member from one of said positions to the other.

21. In a film handling apparatus, a toothed member for positively feeding a perforated film, means adapted for movement toward the path of the film whereby the film is placed in operative engagement with said member, means adapted for arcuate movement across such path from the opposite side thereof whereby the film is bodily removed from said member, and mechanism for operating said means alternately.

22. In a film handling apparatus, film carrying means, toothed film feeding means, movable means for holding the film in operative engagement with the teeth of said feeding means, means movable through that section of the path of the film which lies between the area of operation of said feeding means and said holding means and effective for bodily removing the film from the teeth of said feeding means, and mechanism for operating said holding and removing means alternately.

23. In a film handling apparatus, toothed means for feeding a film, means for moving the film into operative engagement with the teeth of said feeding means, a protective member, said member being adapted to occupy a plurality of positions in the first of which it is situated between the area of operation of said feeding means and said moving means whereby the film is protected from the teeth of said feeding means and in the second of which it is removed from such position between such area of operation and said moving means whereby the film may be brought into operative engagement with the teeth of said feeding means, and mechanism adapted to move said member from said first to said second position and to operate said moving means.

24. In a film handling apparatus, toothed means for feeding a film, means for moving the film into operative engagement with the teeth of said feeding means, a protective member, said member being adapted to occupy a plurality of positions in the first of which it is situated between the area of operation of said feeding means and said moving means whereby the film is protected from the teeth of said feeding means and in the second of which it is removed from such position between such area of operation and said moving means whereby the film may be brought into operative engagement with the teeth of said feeding means, and mechanism adapted to move said member from one of said positions to the other.

25. In a film handling apparatus, an openable gate, a toothed member for positively feeding a perforated film through said gate, means for moving the film into operative engagement with the teeth of said member, means movable through that section of the path of the film which lies between said last mentioned means and said member and effective for bodily removing the film from the teeth of said member, and interlocked mechanism for closing or opening said gate and alternately actuating each of said means.

26. In a film handling apparatus, a sectional gate including a fixed section and a section movable relatively thereto, a toothed member for positively feeding a perforated film between said sections, means for moving the film into operative engagement with said member, movable means for bodily removing the film from such engagement with said member, and control means effective first for moving said movable section into cooperative relation with said fixed section and said first mentioned means toward the path through which the film is fed through said apparatus whereby the gate is closed and the film is placed in operative engagement with said member and thereafter for moving said movable section away from said fixed section and said means for bodily removing the film across that portion of the path of the film which lies between the first mentioned means and said member whereby the gate is opened and the film is removed from such engagement with said member.

27. In a film handling apparatus, an openable gate, means for feeding a film through said gate, operable means for holding the film in operative engagement with said feeding means, means movable through that portion of the path of the film which lies between said feeding means and said holding means for bodily removing the film from said feeding means, and mechanism for alternately closing said gate and operating said holding means and opening said gate and operating said removing means.

28. In a film handling apparatus, an openable gate, means for feeding a film through said gate, operable means for bodily removing the film from said feeding means, and control means for opening said gate and operating said removing means, said removing means being so constructed as to embrace the area of operation of said feeding means after having been moved to operative position thereby rendering said feeding means completely inaccessible by the film.

29. In a film handling apparatus, an openable gate, means for feeding a film through said gate, and film engaging means movable to a position embracing the normal area of operation of said feeding means when said gate is opened whereby the film is shielded from said feeding means.

30. In a film handling apparatus, a gate comprising a plurality of sections one of which is movable relatively to another, toothed means for feeding a film between said sections, a member movable to a position embracing the area of operation of said feeding means whereby the film is protected from the teeth of said means, and common actuating mechanism for said member and said movable gate section.

Signed at New York city, in the county of New York and State of New York, this 26th day of February, A. D. 1929.

BARTON ALLEN PROCTOR.